Dec. 2, 1930.  H. H. SIMON  1,783,590
AIRPLANE
Filed Aug. 14, 1928   4 Sheets-Sheet 1
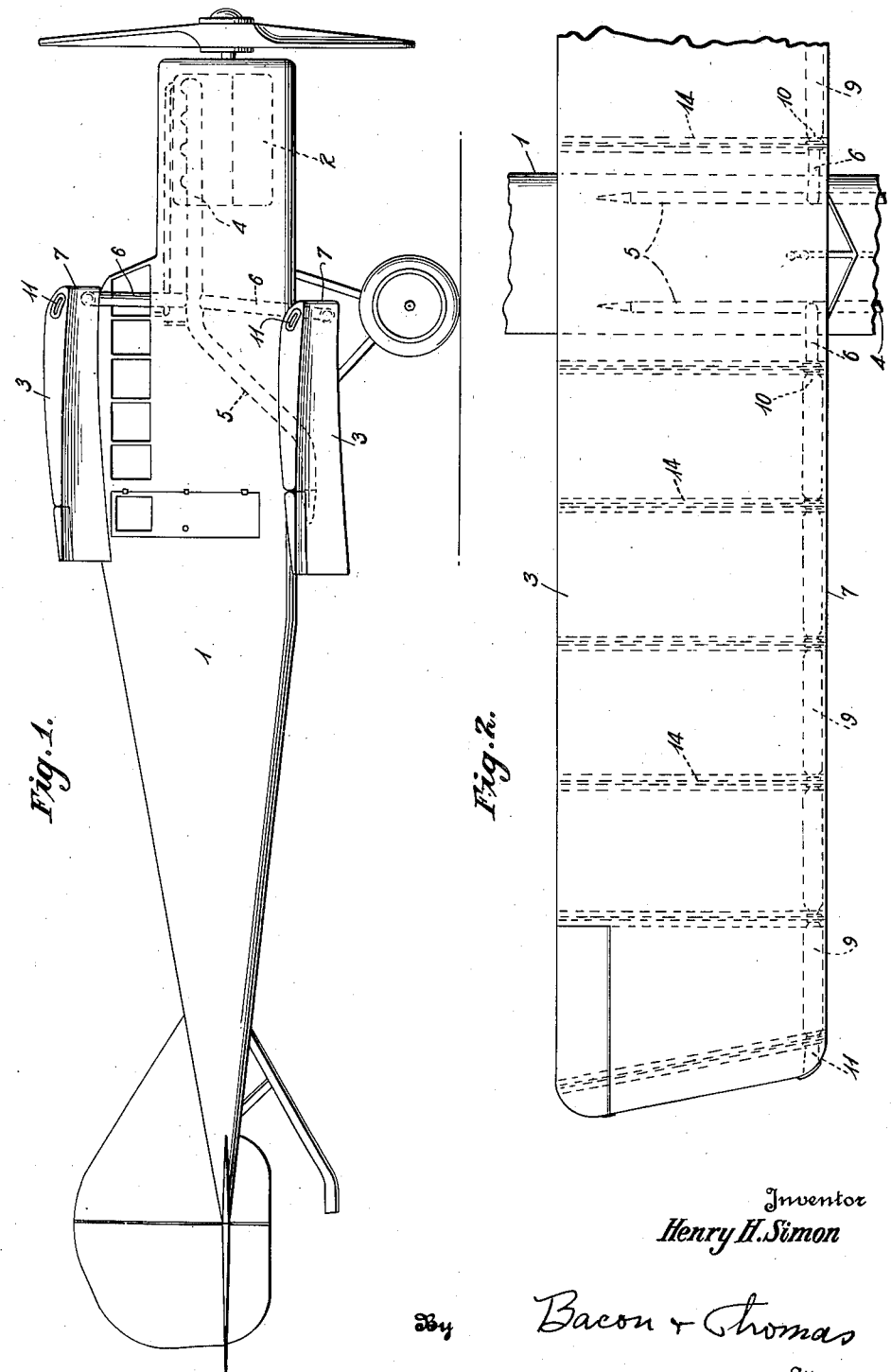
Inventor
Henry H. Simon
By Bacon & Thomas
Attorneys Dec. 2, 1930.  H. H. SIMON  1,783,590
AIRPLANE
Filed Aug. 14, 1928    4 Sheets-Sheet 2
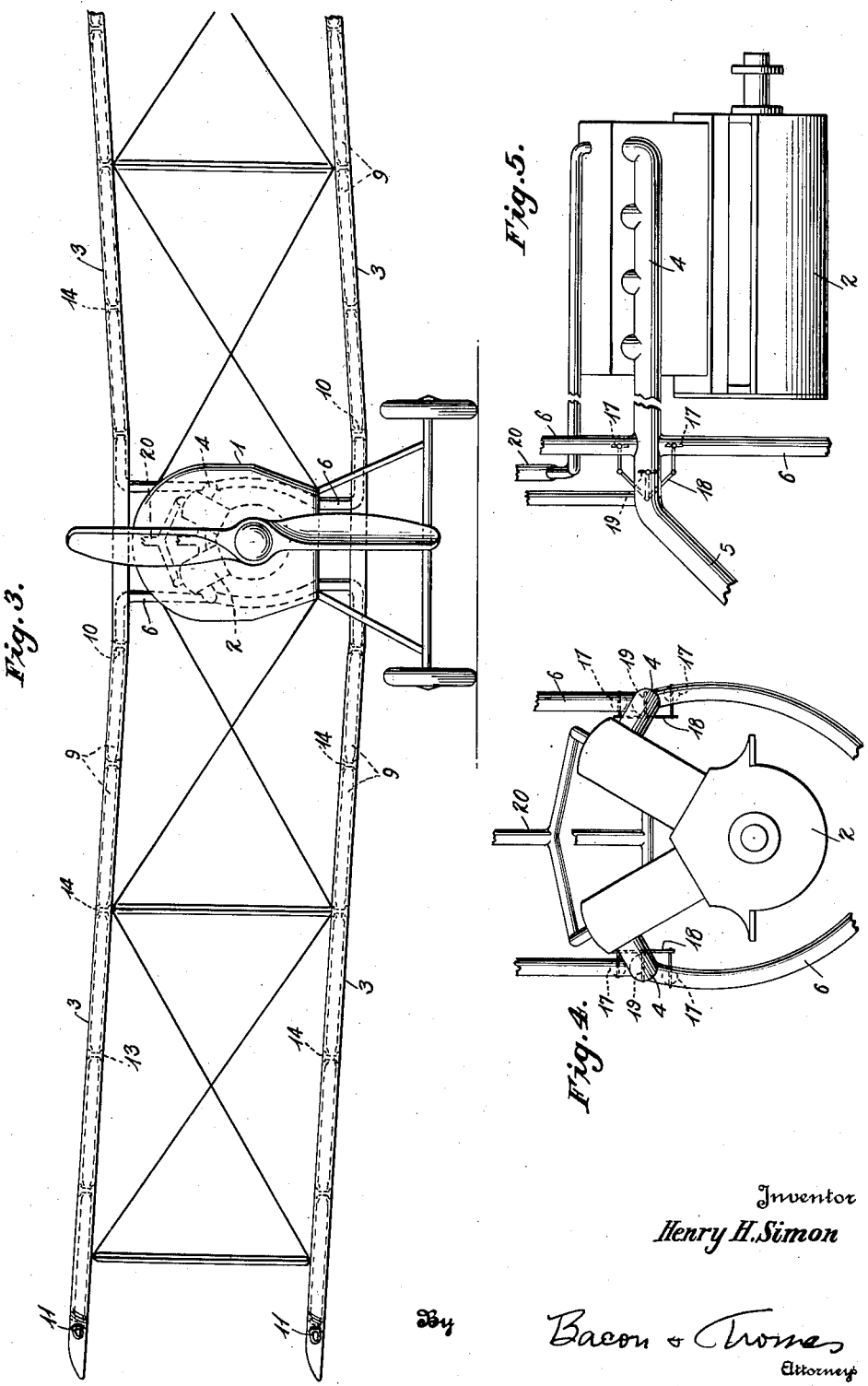
Inventor
Henry H. Simon Dec. 2, 1930.  H. H. SIMON  1,783,590
AIRPLANE
Filed Aug. 14, 1928  4 Sheets-Sheet 3
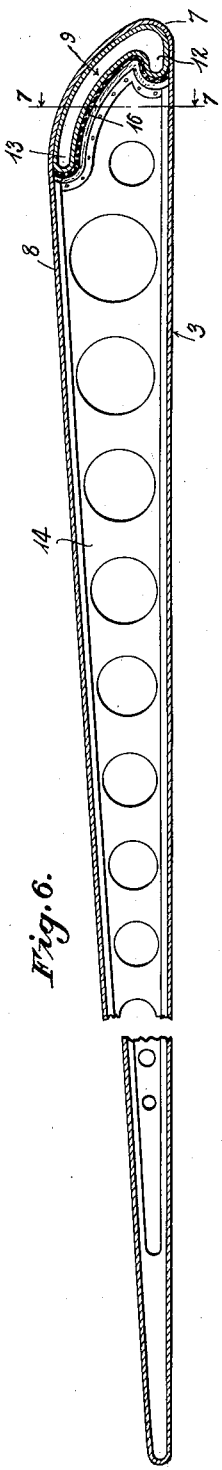
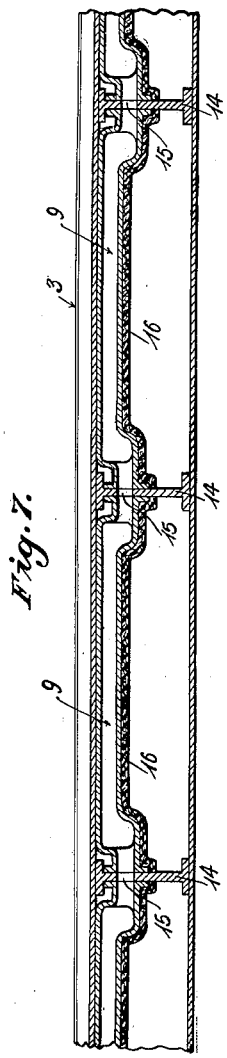
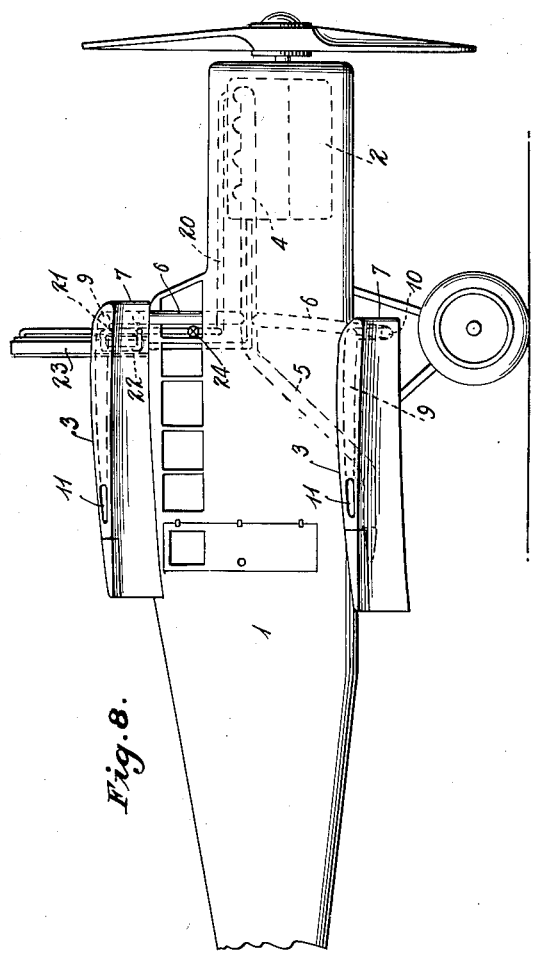
Inventor
Henry H. Simon
By Bacon & Thomas
Attorneys

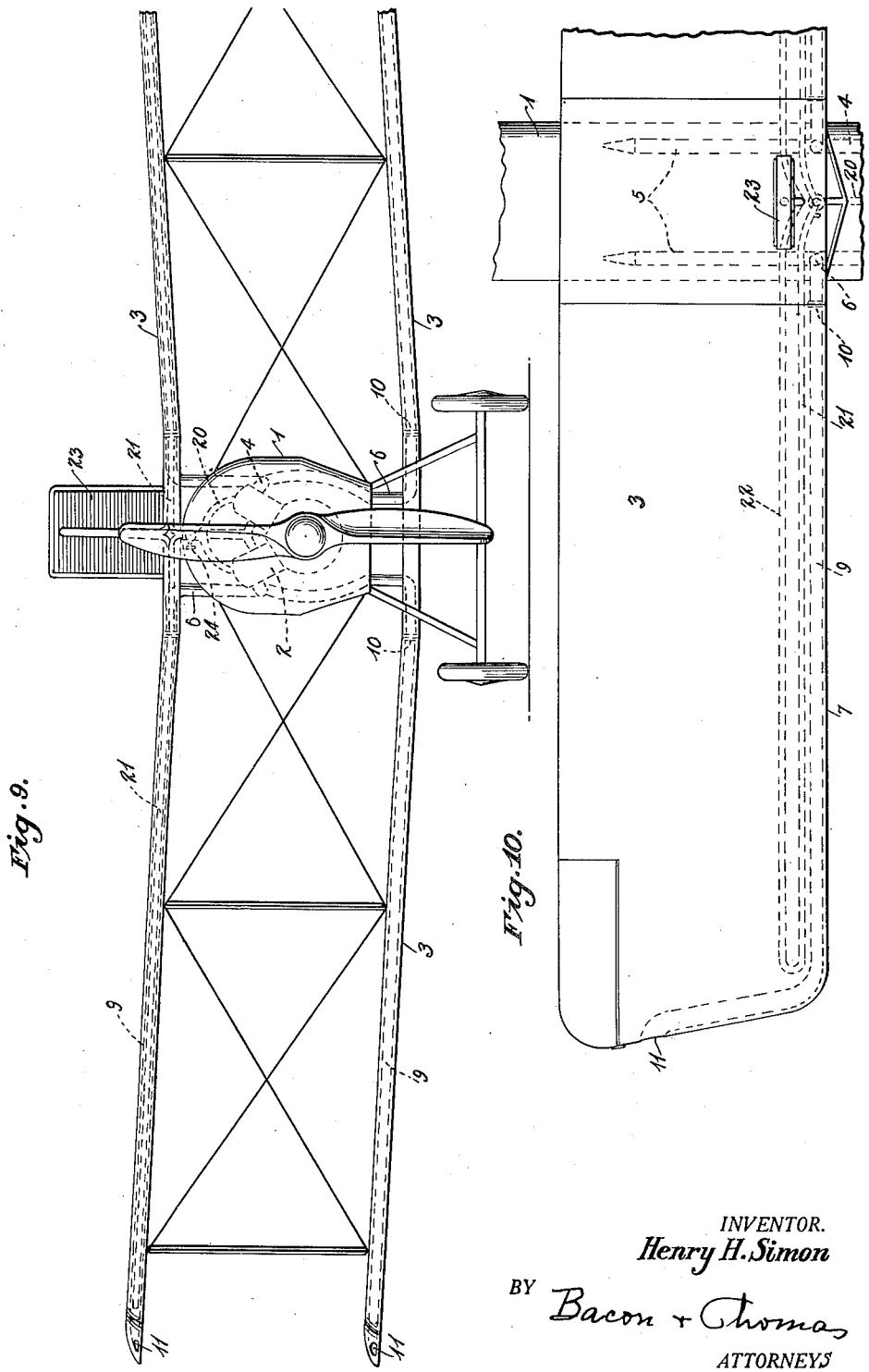

Patented Dec. 2, 1930

1,783,590

UNITED STATES PATENT OFFICE

HENRY HERBERT SIMON, OF GREENVILLE, SOUTH CAROLINA

AIRPLANE

Application filed August 14, 1928. Serial No. 299,475.

My invention relates to improvements in airplanes and has for its object the provision of means whereby the formation of ice on the wings of an airplane is prevented.

With this object in view, I intend to utilize the exhaust from an airplane engine to heat the forward or "entering" edge of the wings. This exhaust from the engine is led from the exhaust manifold through conduits to the various front edges of each wing and conducted throughout the entire length thereof, being finally expelled into the atmosphere.

It is a further object of my invention to so construct the exhaust conduits that conduct the exhaust gases along the edges of the wings as to support and strengthen the wings at these points, the conduits being shaped to conform to the entire inside area of the front edge of the wings extending along the under surface of the top and bottom wing covering as far back as deemed expedient, to thereby strengthen and support the same. Obviously, however, the exhaust conduits may be so constructed as to form the entering or forward edge of the wings themselves and need not be placed within the covering.

Other detailed objects of this invention such as the control of the exhaust gases and the specific construction and arrangement of the heating conduits for the wings will be apparent from the following detailed description of my invention and with reference to the accompanying drawings, in which, Fig. 1 is a side elevational view of an airplane equipped with this invention, Fig. 2 is a top plan view, partly broken away, of the structure disclosed in Fig. 1, Fig. 3 is a front elevational view of the structure disclosed in Fig. 2, Figs. 4 and 5 are elevational views of the engine associated with the airplane and illustrating the piping arrangements for conducting exhaust gases and the cooling medium to the wing structures, Figs. 6 and 7 are sectional views of the wing structure and illustrate the arrangement of exhaust conduits for conveying the exhaust gases along the edge of a wing structure, Fig. 8 is a side elevational view of an airplane equipped with a slightly modified form of heating structure, Fig. 9 is a front elevational view of an airplane equipped with the system disclosed in Fig. 8, and Fig. 10 is a top plan view, partly broken away, of the heating structure disclosed in Figs. 8 and 9.

In the accompanying drawings forming a part of this specification and in which the same reference characters are employed to designate like parts throughout the same, In the drawings, 1 represents generally an airplane, 2 the engine thereof, and 3 the wings.

The usual exhaust manifold is indicated at 4 and is adapted to discharge under normal conditions direct to the atmosphere through outlet 5. Leading from the exhaust manifold 4 are a series of pipes or conduits 6 for conveying the exhaust gases to the wings, as will be very fully described hereinafter.

The forward or entering edges of the wings are indicated at 7 and located within the usual metal wing covering 8 at the forward edge are the conduits 9 adapted to be connected at their inner ends 10 with the pipes 6 leading from the exhaust manifold. These conduits 9 open at their outer ends 11 through the outside of the wings at their forward edges to the atmosphere.

The conduits 9 are constructed to reinforce and strengthen the wings at their forward edges and also are of sufficient area to insure heating the same and prevent any ice formation thereon. Obviously these conduits may be formed of any shape necessary to conform to the forward edge of the wings and as heretofore stated may be extended back along the top and bottom of the covering on the inside to any extent found to be expedient. One form of exhaust conduit construction is shown in the drawings wherein there is a base or bottom portion 12 and an upwardly and backwardly curved portion 13 conforming to the curved front edge of the wing. These exhaust conduits may be formed in single pieces for each wing or may be formed in sections adapted to be disposed between the wing supporting ribs 14. In the latter case, as illustrated in Fig. 7, showing a section of the conduit between two ribs, the conduit is formed at its ends with openings 15 adapted to extend through the ribs to the next section of conduit and so on throughout the entire width of the wing. These various sections have flanges riveted to the ribs and to the adjacent sections of conduits.

It also will be obvious that I may so construct these sections that they are telescopic with relation to one another.

At 16 I have designated insulation for the exhaust conduits located on the inner side thereof, the purpose of this insulation being to force radiation toward the covering and the forward edge of the wings.

The entrance of the exhaust gases to the conduits at the wing edges is controlled by valve 17 preferably located in the pipe 6 leading from the manifold and connected by links 18 under control of the operator or pilot. A valve 19 controls the outlet 5 of the exhaust manifold and is suitably connected to operate in unison with the valves 17 by links, etc. When the valve 17 is in closed position the valve 19 is open and the exhaust is expelled direct to the atmosphere through the outlet 5, and when the valve 17 is open the valve 19 is closed and the exhaust gases traverse the pipes 6 and conduits 9 through the full length of the wing edge and to the atmosphere at 11.

A modified form of my invention is shown in Fig. 5 wherein I utilize the water in the cooling system to also assist in heating the forward wing edge when desirable. In this construction pipes 20 lead from the cylinder jacket and are connected to pipes 21 located in the forward edges of the wings, preferably, although not necessarily, behind the exhaust conduit. These hot water pipes 21 are extended along the wing edges and lead back through return pipe sections 22 to the radiator 23. The flow of water through these pipe sections is controlled by suitable valves 24 adapted to be actuated by the pilot.

While the above description is the preferred form of my invention, various changes may be made without departing from the spirit thereof and within the scope of the attached claims. For instance, it is obvious that the exhaust conduits at the wing edges may be, as heretofore stated, so formed as to themselves constitute the leading edge of the wing and need not necessarily be located within the wing covering.

Having thus described the invention, what I claim is:

1. Means for heating the forward edges of airplane wings comprising a conduit for conveying a heating medium, the conduit being constructed in sections the adjacent ends of which are interconnected and secured to the frame members of the wings so as to reinforce the entire wing structure at the forward edge thereof.

2. An airplane including a body, engine and wings, an exhaust manifold for the engine having an outlet direct to the atmosphere, pipes leading from the manifold to the wings, conduits arranged at the forward edge of the wings and communicating at their inner ends with the pipes, an opening into the atmosphere at their outer ends, the conduits having an upwardly and rearwardly curved portion conforming at its forward surface to the curvature of the wing edges, and means to direct the flow of the exhaust gases through the pipes leading from the manifold or through the manifold outlet leading direct to the atmosphere.

3. In combination, an airplane having wings formed with transverse ribs, a source of heat and sectional conduits extending along the forward edges of the wings for conveying the heat to the wing edges, the conduits being so constructed along their forward outside surfaces to assume the curvature of the wings at their forward areas, the adjacent ends of the conduit sections being interconnected and attached to the said ribs by flanges.

In testimony whereof I affix my signature.

HENRY HERBERT SIMON.